Jan. 17, 1961  C. L. LONG  2,968,067
PROCESS FOR MAKING ORIENTED FILMS
Filed Feb. 2, 1959
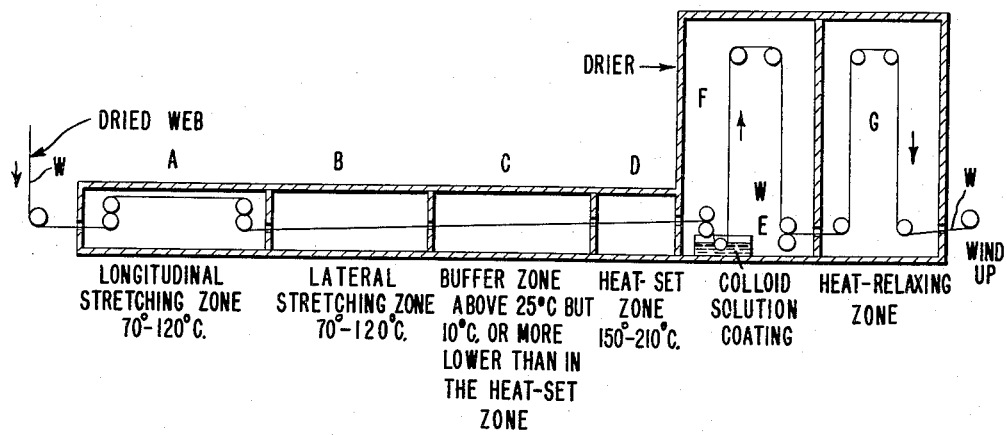
INVENTOR
CECIL LOUIS LONG
BY *Lynn Barrett Morris*
ATTORNEY

United States Patent Office 2,968,067
Patented Jan. 17, 1961

2,968,067

PROCESS FOR MAKING ORIENTED FILMS

Cecil Louis Long, Westfield, N.J., assignor to E. I. du Pont de Nemours and Company, Wilmington, Del., a corporation of Delaware Filed Feb. 2, 1959, Ser. No. 790,404

8 Claims. (Cl. 18—48)

This invention relates to an improved process for making biaxially oriented organic polymer films. More particularly it relates to such a process which can be carried out on a continuous scale. Still more particularly, it relates to an improved process for biaxially orienting unsupported films composed of an orientable, crystallizable, linear polyester and including such films which may have a thin coating of a hydrophobic polymer.

Practical methods for stretching polyester films are disclosed in Alles and Saner U.S. Patent 2,627,088, February 3, 1953, Knox U.S. Patent 2,718,666, September 27, 1955, Alles and Heilman U.S. Patent 2,728,941, January 3, 1956, and in Alles U.S. Patent 2,779,684, January 29, 1957. Due to variations in polymer composition which occur in an integrated polymer formation and film casting and biaxial orientation process as described in said patents, it is difficult to obtain a film having uniform thickness, balanced orientation and balanced properties in the finished film. It has been observed that while the lateral stretching of a longitudinally stretched web of a polyester film is taking place, e.g., in the process of the Alles and Heilman patent, the central portion of the web tends to lag behind the edges of the film which are guided under tension, and a uniform balance of properties across the web is not obtained. The biaxially stretched web is then passed into a heat-setting zone maintained at a temperature, e.g., 30° C. to 90° C. above that in the lateral stretching zone, and while it might be expected that the film would improve in uniformity, it has been found that balanced properties are not improved by this step alone, nor by a subsequent heat-relaxing step. To the contrary, the tendency of the central portion of the web to lag behind the edges is aggravated by passing it directly into the heat-set zone.

An object of this invention is to provide improvements in processes for biaxially stretching films of orientable, crystallizable organic polymers. Another object is to provide such an improved process which can be carried out on a continuous commercial scale. Yet another object is to provide such an improved process which produces high quality biaxially oriented organic polymer films which show a marked improvement in uniformity of orientation over prior art films. A further object is to provide such improvements which do not require expensive additional apparatus or units. Still further objects will be apparent from the following description of the invention.

The above objects are attained in accordance with this invention which comprises a process for making polymeric films having balanced properties which comprises (a) stretching in the direction longitudinal of said film at a temperature between 70 and 120° C. while under some tension to prevent significant contraction in a right-angle direction an unoriented film composed of an orientable, crystallizable, linear, organic polymer which is capable of being formed into filaments which when cold-drawn show by characteristic X-ray patterns molecular orientation along the fiber axis, (b) stretching the film in the other direction (i.e., laterally) at a temperature between 70 and 120° C., (c) maintaining the biaxially oriented film in a range of temperatures between at least 10° C. below the heat set temperature and 25° C. for a period of 0.005 to 5 minutes while maintaining the lateral and longitudinal tensions essentially the same as those reached at the end of the second stretching step (i.e., the biaxially stretched film is held in such a manner as to maintain its lateral dimension while advancing it in a manner which does not affect its longitudinal dimension), (d) heat-setting the resulting film at a temperature from 150 to 230° C. under conditions such that no substantial shrinkage occurs, and (e) if desired, modifying the heat-set film at a temperature from 90 to 150° C. while maintaining it under slight tension. A layer of water-permeable colloid, e.g., gelatin, can be applied to the resulting film which can be dried and passed to a suitable windup station. The latter layer can be applied prior to step (e) if desired, and, in fact, constitutes the preferred manner of carrying out the invention. Other coatings, e.g., heat-sealing treatments, etc., preferably from aqueous solutions or dispersions can be applied and dried before wind-up or as a separate later operation.

The invention is particularly useful in making oriented polymer films having a finished film thickness of 0.2 to 10 mils from the polyester films described in the foregoing Alles et al. and Alles patents and including such non-oriented films having a thin layer on one or both surfaces of the hydrophobic polymers described in said patents.

It will be appreciated that step (c) described above is a new step in a biaxial film-orientation process and constitutes an important feature of novelty of the present invention. This step is carried out in what can be termed a buffer zone or zones of a stretching apparatus, between the second (lateral) stretching zone and a heat-setting zone, for example, after the lateral stretching unit shown in Fig. 2 of Alles et al. 2,728,941. The buffer zone or zones may be an apparatus similar to the non-diverging portion of the stretching apparatus shown in said Fig. 1 of said patent when unoriented, beaded-edge films are treated in accordance with the present invention. These beaded-edge films, as disclosed in the said Alles et al. and Knox patents can be formed with extrusion apparatus of Bicher U.S. Patent 2,754,544, July 7, 1956, or Bicher U.S. Patent No. 2,821,746 issued February 4, 1958, or in other convenient manners as disclosed by Knox.

This invention is useful in processes where film is first stretched longitudinally and then laterally. The process is illustrated further by reference to the attached drawing which forms a part of this application. This drawing is schematic. Referring now to the drawing, in an exemplary procedure a cast polyethylene terephthalate film having beaded edges and bearing a thin layer on each surface of a vinylidene chloride copolymer is made and dried as disclosed in Alles Patent 2,779,684. The dried web is then passed through a longitudinal stretching zone A maintained at a temperature from 70 to 120° C., through a lateral stretching zone B at a temperature 70 to 120° C., through a buffer zone or zones C at temperatures ranging from 10° C. below the heat-set temperature to 25° C. and then through a heat-set zone D, into chamber E where a water-permeable sublayer is applied, then into a drying zone F through a heat-relaxing zone G and thence to a windup station. The heat-set zone can be maintained at 150 to 230° C.

In a preferred form of the invention of particular value where a large difference of temperature exists between the lateral stretching temperature and the heat-setting temperature it is desirable to have two or more buffer zones where the temperature is changed in a series of steps between the stretching zone and the heat-setting temperature. For example, two or more buffer zones held at different intermediate temperatures can be usefully employed, or the temperature of one zone can be below the lateral stretching temperature and the next zone or zones can be held at temperatures intermediate between said stretching temperature and the heat-set temperature.

The invention will be further illustrated by but is not intended to be limited to the following examples:

Example I

A non-oriented polyethylene terephthalate film element having a cross-section such that the body of the film is about 15.33 inches wide and a thickness of about 0.036 inch with edges having a thickness of about 0.110 inch for a distance approximately 0.125 inch in from the edge is biaxially stretched, 3 times by 3 times, in a temperature range of 80 to 100° C. The biaxially stretched film is then heat-set at a temperature of about 185° C. and modified at a temperature of about 120° C. for the time periods and under the temperature conditions set forth in Alles U.S. Patent 2,779,684. A sample of the resulting film exhibited a variation in birefringence from edge to edge of .03.

A second sample of the non-oriented film described above is treated according to the same procedure except that after lateral stretching the film is held at a temperature of 88° C. for about 8 seconds. The film is then heat-set and heat-relaxed as described in the preceding paragraph of this example. A sample of the resulting film exhibited a variation in birefringence from edge to edge of only 0.01.

Similar results can be obtained by applying a sublayer of aqueous gelatin and drying the sublayer prior to modifying the heat-set film.

Example II

A non-oriented polyethylene terephthalate film element having a cross-section such that the body of the film is about 15.33 inches wide and a thickness of about 0.036 inch with edges having a thickness of about 0.110 inch for a distance approximately 0.125 inch in from the edge is biaxially stretched, 3 times by 3 times, at a temperature of 80 to 100° C. The biaxially stretched film is then heat-set at a temperature of about 185° C. and modified at a temperature of about 120° C. for the time periods and under the temperature conditions set forth in Alles U.S. Patent 2,779,684. A sample of the resulting film exhibited a variation in birefringence from edge to edge of .03.

A second sample of the non-oriented film described above is treated according to the same procedure except that after lateral stretching the film is held at a temperature of 25° C. for about 8 seconds. The film is then heat-set and heat-relaxed as described in the preceding paragraph of this example. A sample of the resulting film exhibited a variation in birefringence from edge to edge of only .01.

Similar results can be obtained by applying a sublayer of aqueous gelatin and drying the sublayer prior to modifying the heat-set film.

Example III

A non-oriented polyethylene terephthalate film element having a cross-section such that the body of the film is about 20.25 inches wide and has a thickness of about 0.009 inch, is biaxially stretched first longitudinally and then laterally 3 times by 3 times at a temperature of 80 to 90° C. The biaxially stretched film is then heat-set at a temperature of about 215° C. for 0.2 minute. A sample of the resulting film exhibited differences in physical properties measured at the edges of the film in direction at angles of +45° and —45° to the longitudinal direction in the major plane of the film as follows:

13,000 pounds per square inch in tenacity
320,000 pounds per square inch in Young's modulus
110% in elongation A second sample of the same film was treated as described above except that after lateral stretching and before heat setting the film is held at a temperature of 120° C. for 0.1 minute while maintaining the lateral and longitudinal tensions essentially the same as those reached at the end of the second stretching step (that is the biaxially stretched film is held in such a manner as to maintain its lateral dimension while advancing it in a manner which does not affect its longitudinal dimension).

A sample of the resulting film exhibited differences in physical properties measured at the edges of the film at angles of +45° and —45° to the longitudinal direction in the major plane of the film as follows:

7,000 pounds per square inch in tenacity
170,000 pounds per square inch in Young's modulus
90% in elongation

Example IV

A non-oriented polyethylene terephthalate film element having a cross-section such that the body of the film is about 20.25 inches wide and has a thickness of about 0.007 inch, is biaxially stretched first longitudinally and then laterally 3 times by 3 times at a temperature of 80 to 90° C. The biaxially stretched film is then heat-set at a temperature of about 200° C. for 0.2 minute. A sample of the resulting film exhibited differences in physical properties measured at the edges of the film in directions at angles of +45° and —45° to the longitudinal direction in the major plane of the film as follows:

12,800 pounds per square inch in tenacity
252,000 pounds per square inch in Young's modulus
92% in elongation A second sample of the same film was treated as described above except that after lateral stretching and before heat setting (which was for only 0.1 minute) the film is held at a temperature of 140° C. for 0.1 minute while maintaining the lateral and longitudinal tensions essentially the same as those reached at the end of the second stretching step (that is the biaxially stretched film is held in such a manner as to maintain its lateral dimension while advancing it in a manner which does not affect its longitudinal dimension).

A sample of the resulting film exhibited differences in physical properties measured at the edges of the film at angles of +45° and —45° to the longitudinal direction in the major plane of the film as follows:

8,400 pounds per square inch in tenacity
160,000 pounds per square inch in Young's modulus
67% in elongation

Example V

A non-oriented polyethylene terephthalate film element having a cross-section such that the body of the film is about 20.25 inches wide and has a thickness of about 0.007 inch, is biaxially stretched first longitudinally and then laterally 3 times by 3 times at a temperature of 80 to 90° C. The biaxially stretched film is then heat-set at a temperature of about 200° C. for 0.2 minute. A sample of the resulting film exhibited differences in physical properties measured at the edges of the film in directions at angles of +45° and —45° to the longitudinal direction in the major plane of the film as follows:

12,800 pounds per square inch in tenacity
252,000 pounds per square inch in Young's modulus
92% in elongation A second sample of the same film was treated as described above except that after lateral stretching and before heat setting (which was for only 0.1 minute) the film is held at a temperature of 175° C. for 0.1 minute while maintaining the lateral and longitudinal tensions essentially the same as those reached at the end of the second stretching step (that is the biaxially stretched film is held in such a manner as to maintain its lateral dimension while advancing it in a manner which does not affect its longitudinal dimension).

A sample of the resulting film exhibited differences in physical properties measured at the edges of the film at angles of +45° and −45° to the longitudinal direction in the major plane of the film as follows:

11,000 pounds per square inch in tenacity
202,000 pounds per square inch in Young's modulus
78% in elongation

*Example VI*

A non-oriented polyethylene terephthalate film element having a cross-section such that the body of the film is about 20.25 inches wide and has a thickness of about 0.007 inch, is biaxially stretched first longitudinally and then laterally 3 times by 3 times at a temperature of 80 to 90° C. The biaxially stretched film is then heat-set at a temperature of about 215° C. for 0.2 minute. A sample of the resulting film exhibited differences in physical properties measured at the edges of the film in directions at angles of +45° and −45° to the longitudinal direction in the major plane of the film as follows:

18,000 pounds per square inch in tenacity
400,000 pounds per square inch in Young's modulus
129% in elongation A second sample of the same film was treated as described above except that after lateral stretching and before heat setting (which was for only 0.1 minute) the film is held at a temperature of 205° C. for 0.1 minute while maintaining the lateral and longitudinal tensions essentially the same as those reached at the end of the second stretching step (that is the biaxially stretched film is held in such a manner as to maintain its lateral dimension while advancing it in a manner which does not affect its longitudinal dimension).

A sample of the resulting film exhibited differences in physical properties measured at the edges of the film at angles of +45° and −45° to the longitudinal direction in the major plane of the film as follows:

16,100 pounds per square inch in tenacity
340,000 pounds per square inch in Young's modulus
115% in elongation

*Example VII*

A non-oriented polyethylene terephthalate film element having a cross-section such that the body of the film is about 20.25 inches wide and has a thickness of about 0.007 inch, is biaxially stretched first longitudinally and then laterally 3 times by 3 times at a temperature of 80 to 90° C. The biaxially stretched film is then heat-set at a temperature of about 215° C. for 0.2 minute. A sample of the resulting film exhibited differences in physical properties measured at the edges of the film in directions at angles of +45° and −45° to the longitudinal direction in the major plane of the film as follows:

13,000 pounds per square inch in tenacity
320,000 pounds per square inch in Young's modulus
110% in elongation A second sample of the same film was treated as described above except that after lateral stretching and before heat setting (which was for only 0.1 minute) the film is held at a temperature of 60° C. for 0.1 minute and then at a temperature of 135° C. for 0.1 minute while maintaining the lateral and longitudinal tensions essentially the same as those reached at the end of the second stretching step (that is the biaxially stretched film is held in such a manner as to maintain its lateral dimension while advancing it in a manner which does not affect its longitudinal dimension).

A sample of the resulting film exhibited differences in physical properties measured at the edges of the film at angles of +45° and −45° to the longitudinal direction in the major plane of the film as follows:

7,800 pounds per square inch in tenacity
120,000 pounds per square inch in Young's modulus
56% in elongation

*Example VIII*

A non-oriented polyethylene terephthalate film element having a cross-section such that the body of the film is about 20.25 inches wide and has a thickness of about 0.007 inch, is biaxially stretched first longitudinally and then laterally 3 times by 3 times at a temperature of 80 to 90° C. The biaxially stretched film is then heat-set at a temperature of about 215° C. for 0.2 minute. A sample of the resulting film exhibited differences in physical properties measured at the edges of the film in directions at angles of +45° and −45° to the longitudinal direction in the major plane of the film as follows:

18,000 pounds per square inch in tenacity
400,000 pounds per square inch in Young's modulus
129% in elongation A second sample of the same film was treated as described above except that after lateral stretching and before heat setting (which was for only 0.1 minute) the film is held at a temperature of 115° C. for 0.1 minute and then at a temperature of 155° C. for 0.1 minute while maintaining the lateral and longitudinal tensions essentially the same as those reached at the end of the second stretching step (that is the biaxially stretched film is held in such a manner as to maintain its lateral dimension while advancing it in a manner which does not affect its longitudinal dimension).

A sample of the resulting film exhibited differences in physical properties measured at the edges of the film at angles of +45° and −45° to the longitudinal direction in the major plane of the film as follows:

10,300 pounds per square inch in tenacity
185,000 pounds per square inch in Young's modulus
74% in elongation As indicated above, the invention is particularly applicable to the treatment of polyester films. These films are usually prepared in thicknesses ranging from 0.25 to 10 mils in finished form and the speed of the film after stretching in both directions may range from 5 to 900 feet per minute. The time of residence of the films in the "buffer" zone or zones and the film temperatures in said zones will, of course, be varied within the specified ranges depending upon such factors as film speeds and widths in order to achieve the desired improvement. They may be composed of any polyester or copolyester corresponding to the reaction product of at least one dicarboxylic acid and at least one dihydric alcohol in which at least 75 mol percent of the acid component is terephthalic acid and at least 98 mol percent of all radicals are aromatic or may be composed of any of the high-melting, difficultly soluble, usually microcrystalline, cold-drawing, linear, highly polymerized esters of terephthalic acid and glycols of the series $HO(CH_2)_nOH$, where $n$ is an integer within the range of 2 to 10, described in Whinfield et al. U.S. Patent 2,465,319.

Useful copolyesters thus include copolyesters of terephthalic acid, isophthalic acid and a glycol having up to 25% isophthalic acid present and the rest terephthalic, as well as copolyesters containing at least 98% terephthalic acid and up to 2% of an aliphatic dicarboxylic acid, e.g., sebacic acid, etc.

The polyesters used in accordance with the present invention need not consist solely of glycol units since some of the glycols react to form polyglycols and small percentages of units from such polyglycols can be present. For instance, when ethylene glycol is a reactant, the polyester may contain from 1 to 15% or more of units from diethylene glycol (i.e., —$CH_2CH_2OCH_2CH_2O$— units). Also, when a mixture of glycols and polyglycols is used, e.g., ethylene glycol and diethylene glycol, the copolymers may contain a substantial proportion of oxyethylene units.

The polyester film may contain a pigment or dye to color it any desired color. When the film is to be used as a photographic film base for X-ray film, it may be tinted green or blue. The copolymer layer may be similarly tinted and may contain an antistatic material. Antistatic layers and antihalation layers can be coated on the surface of the film or on the copolymer layer. The polyester films made in accordance with this invention are useful for the purpose described in the patents referred to above, as well as those described in Knox 2,686,931.

This invention has the advantage that it provides a simple and dependable process for making oriented polymer films with balanced orientation. Another advantage is that the process does not require additional complicated equipment. A further advantage is that it enables one to obtain an oriented polymeric film having more nearly balanced physical properties, e.g., thickness uniformity, yield point, modulus, birefringence, break point, etc., across the web. By birefringence is meant the difference between the maximum and minimum refractive indices in any given plane of an anisotropic, light-transmitting material. In addition to the mentioned advantages, the employment of a buffer zone or zones where the film is held at constant lateral dimension between the lateral stretching zone and the heat setting zone greatly reduces the tendency of the film to break or tear at the edges as compared to the condition where the temperature is raised sharply from the stretching to heat setting temperature while the edges of the film are diverging. Still other advantages will be apparent from the above description.

This application is a continuation-in-part of my co-pending application Ser. No. 689,560, filed October 11, 1957.

What is claimed is:

1. A process for making polymeric film having balanced properties from an unoriented film composed of an orientable, crystallizable, linear, organic polymer which is capable of being formed into filaments which when cold-drawn show by characteristic X-ray patterns molecular orientation along the fiber axis which comprises treating a continuous, moving length of said unoriented film by (a) stretching said film longitudinally at a temperature between 70° and 120° C. while it is moving and is under lateral tension to prevent significant contraction in a direction at right angles to the direction of travel, (b) then stretching the moving film in the lateral direction at right angles to the longitudinal direction at a temperature between 70° and 120° C., whereby at the end of the longitudinal and lateral stretching steps a biaxially oriented film is formed, then (c) passing said oriented film into a separate zone at a controlled temperature and maintaining the biaxially oriented film for .005 to 5 minutes at a temperature above 25° C. but at least 10° C. less than the temperature used in subsequent heat-setting step (d) while maintaining the lateral and longitudinal tensions essentially the same as those reached at the end of the lateral stretching step, and (d) heat-setting the resulting film at a temperature from 150° to 230° C. under conditions such that no substantial shrinkage occurs; steps (c) and (d) being carried out while the oriented film is moving at a speed of 5 to 900 feet per minute.

2. A process as defined in claim 1 which includes the further step of modifying the heat-set film at a temperature from 90° to 150° C. while maintaining it under slight tension.

3. A process as defined in claim 1 which includes the further step of modifying the heat-set film at a temperature from 90° to 150° C. while maintaining it under a tension of 10–300 pounds per square inch.

4. A process as defined in claim 1 which includes the further step of modifying the heat-set film at a temperature from 90° to 150° C. while maintaining it under slight tension and, prior to said modifying treatment, applying a layer of a water-permeable organic colloid to said film.

5. A process as defined in claim 1 wherein the film in step (c) is maintained at a temperature above 25° C. but from 45° C. to 70° C. below the temperature used in step (d).

6. A process as defined in claim 1 wherein the film in step (c) is maintained first for at least 0.005 minute at a temperature from 25° to 75° C. and then for at least 0.005 minute at a temperature of 70° to 100° C. below the temperature used in the heat-set step (d).

7. A process as defined in claim 1 wherein said organic polymer is a polyester corresponding to the reaction product of at least one dicarboxylic acid and at least one glycol of the formula $HO(CH_2)_nOH$ where $n$ is an integer from 2 to 10, at least 75 mol percent of the acid component being terephthalic and at least 98 mol percent of the total acid component being dibasic aromatic.

8. A process as defined in claim 1 wherein said organic polymer is polyethylene terephthalate.

References Cited in the file of this patent

UNITED STATES PATENTS

| | | |
|---|---|---|
| 2,627,088 | Alles et al. | Feb. 3, 1953 |
| 2,779,684 | Alles | Jan. 29, 1957 |